United States Patent [19]

Halliar

[11] 4,000,703
[45] Jan. 4, 1977

[54] TROUGH HATCH LOCKING DEVICE
[75] Inventor: William R. Halliar, Whiting, Ind.
[73] Assignee: Pullman Incorporated, Chicago, Ill.
[22] Filed: June 11, 1975
[21] Appl. No.: 585,985
[52] U.S. Cl. .............................. 105/377; 114/203; 292/256.5; 292/257
[51] Int. Cl.² ........................................ B61D 39/00
[58] Field of Search ........... 105/377; 292/113, 256, 292/256.5, 257; 52/45, 51; 220/314, 323; 114/203

[56] References Cited
UNITED STATES PATENTS

| | | | |
|---|---|---|---|
| 2,745,362 | 5/1956 | Lunde | 105/377 |
| 2,816,683 | 12/1957 | Miers et al. | 105/377 X |
| 3,797,411 | 3/1974 | Nagy et al. | 105/377 |
| 3,800,714 | 4/1974 | Stark et al. | 105/377 |
| 3,848,912 | 11/1974 | Jensen et al. | 292/256.5 |

Primary Examiner—Robert J. Spar
Assistant Examiner—Randolph A. Reese
Attorney, Agent, or Firm—Richard J. Myers

[57] ABSTRACT

A hinged hatch cover for the longitudinal hatch opening of a railway hopper car includes a hinged hold down arm which is adapted to be moved into a lock position relative to the hatch cover, the hold down arm including a projecting end portion which is engaged by a manually movable lever slidably supported on a pedestal, the same being engageable with the hold down arm for releasably securing the hatch cover in a lock and sealing position relative to the hatch opening.

9 Claims, 7 Drawing Figures

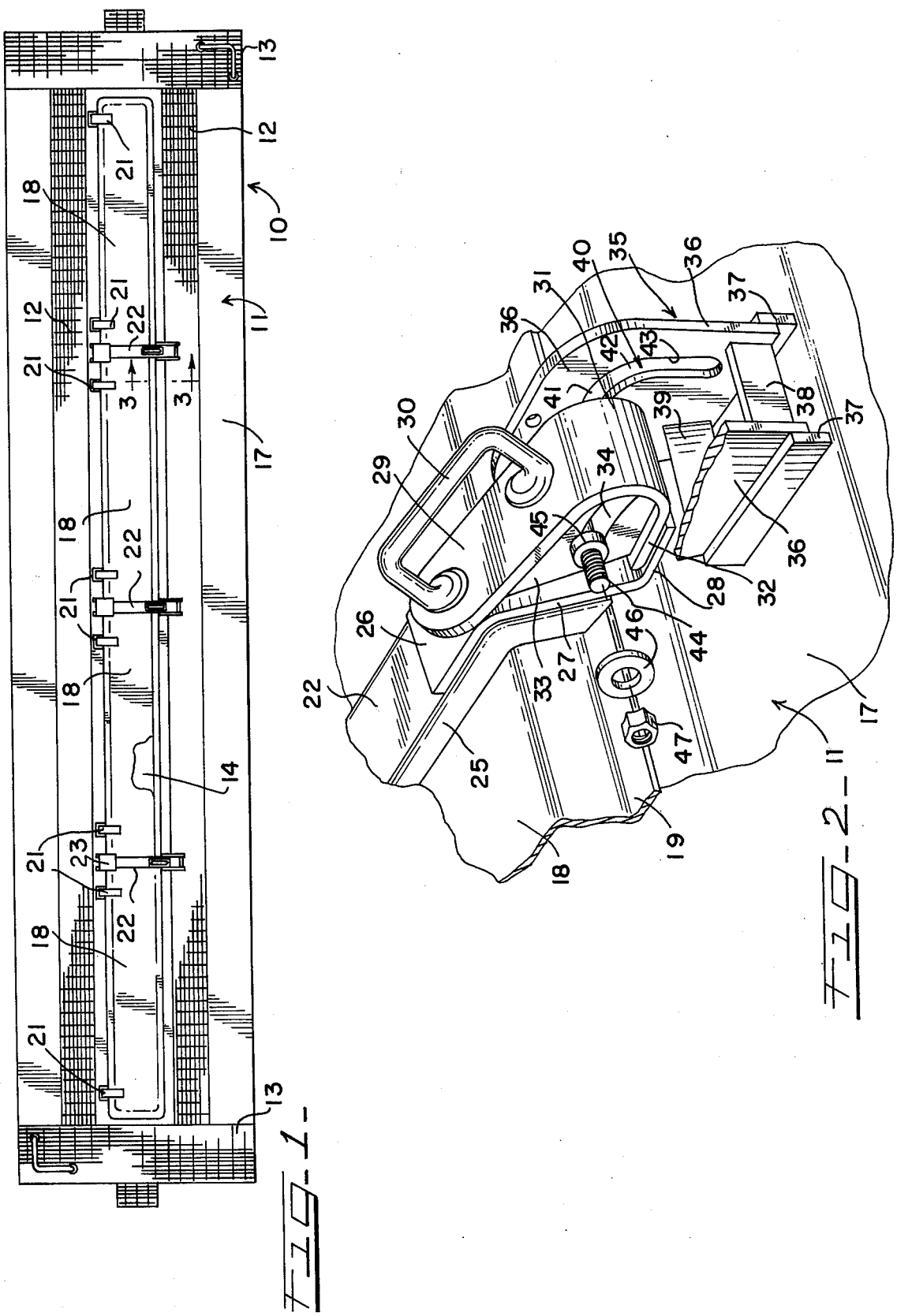

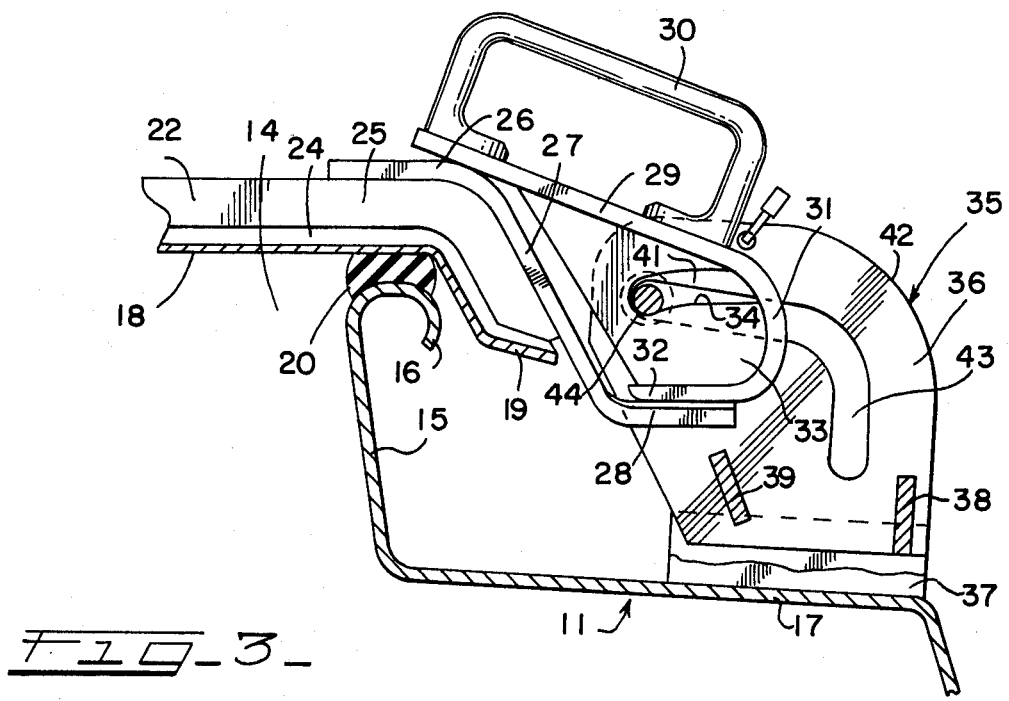
FIG_3_
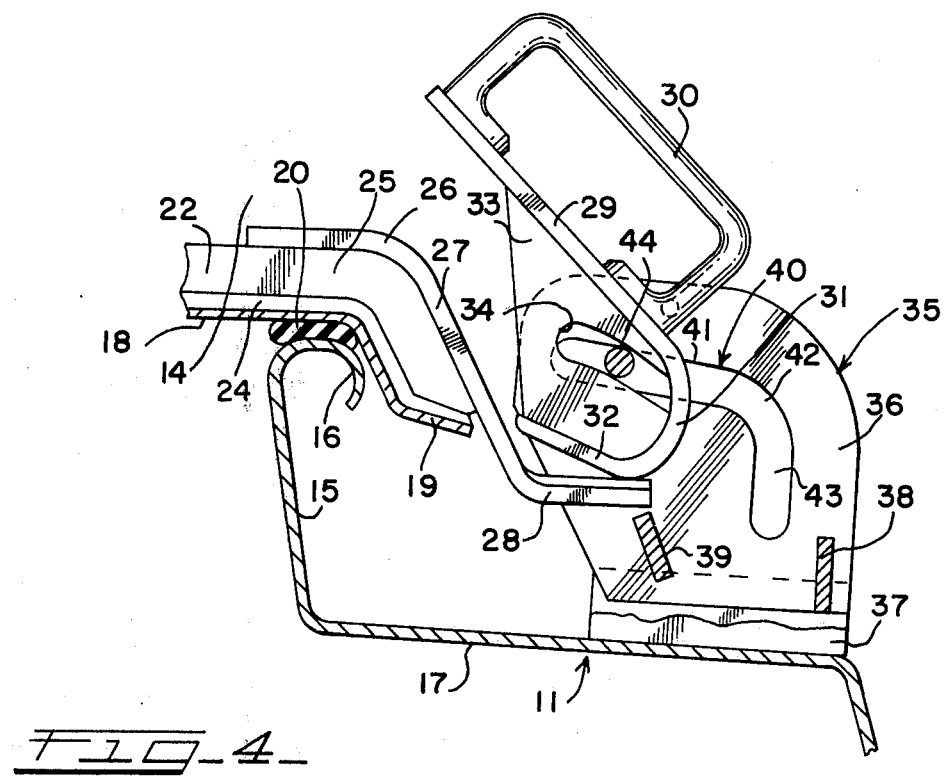
FIG_4_

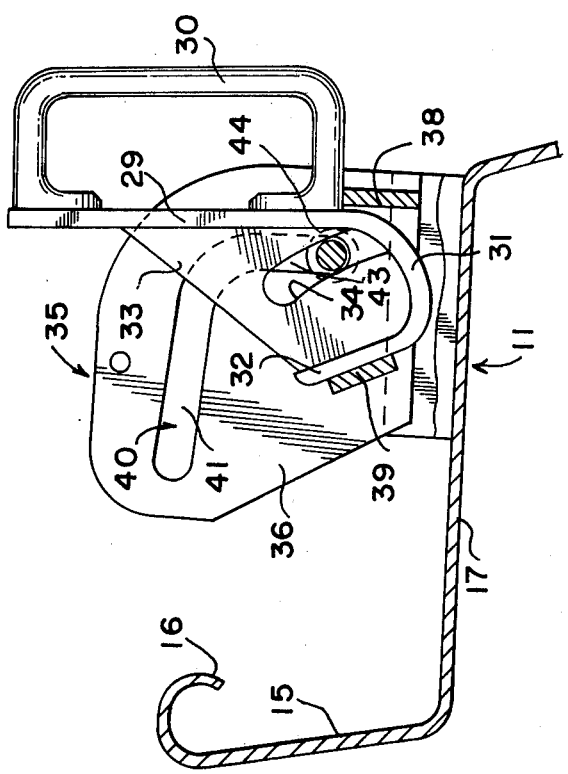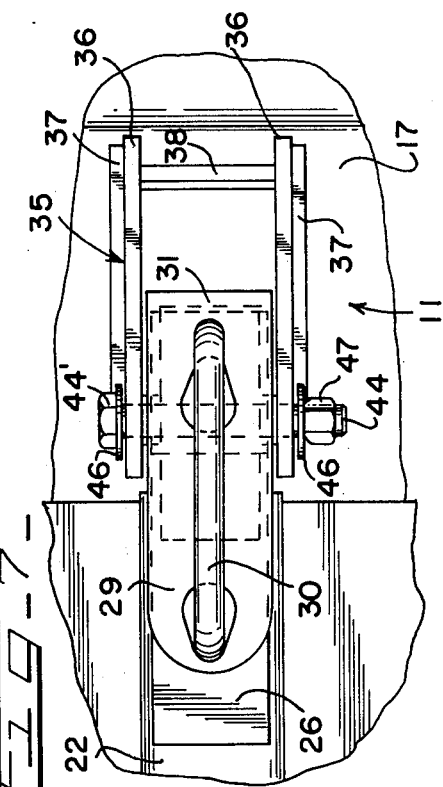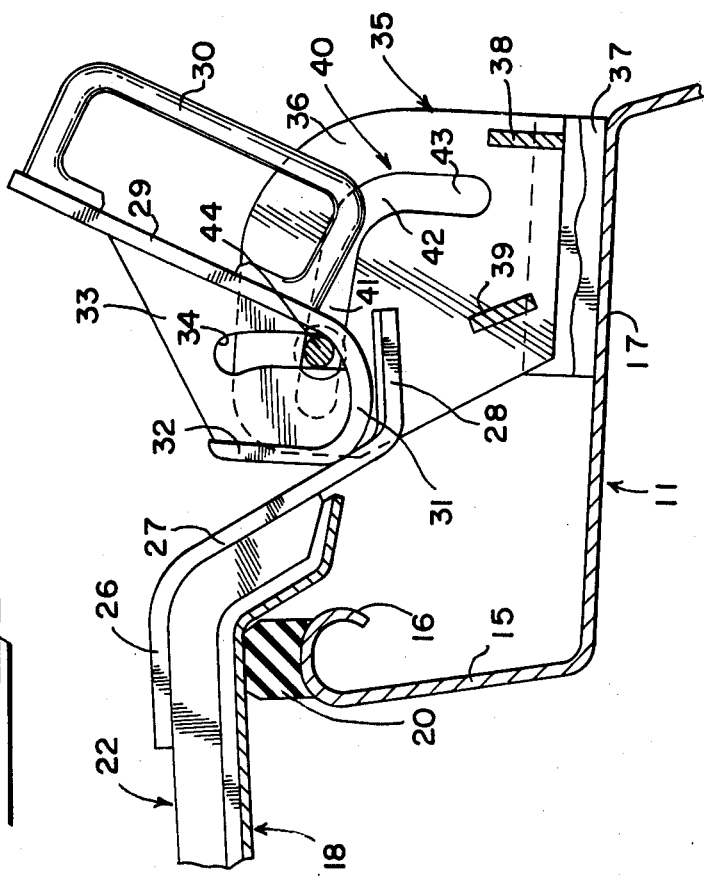

TROUGH HATCH LOCKING DEVICE

BACKGROUND OF THE INVENTION

1. Field of the Invention

This invention relates to railway hopper cars and in particular to those having a longitudinally extending hatch opening which is closed by a trough hatch arrangement. In the present invention adjacent end portions of each trough hatch cover are closed by means of a hold down arm which is locked in position by a manually operated latch element.

2. Description of the Prior Art

The prior art is exemplified by U.S. Pat. Nos. 2,454,688, 3,025,094, 2,869,909, 3,760,743 and 3,800,714. The present invention provides for an improved simplified locking device for retaining the hold down arm of a hinged hatch cover arrangement in a locking position.

SUMMARY

In U.S. Pat. No. 3,800,714, dated Apr. 2, 1974, a trough hatch locking device includes a plurality of hatch covers which are hingedly positioned in longitudinally adjacent relation for selectively opening and closing portions of an elongated hatch opening provided in the roof of a railway hopper car. Longitudinally adjacent sides of the longitudinal hatch covers are sealed by means of a hinged hold down arm which also is provided for securing the hatch covers in closed position. Each of the individual hold down arms is provided with a locking device including an upwardly extending pedestal rigidly supported on the roof of the car adjacent outwardly extending projections provided on each of the hold down arms. The pedestals each in turn support a lever arrangement which includes a manually operated handle member connected to the lever for moving the same in sliding relation relative to the pedestal from an open position of a closed position wherein the lever initially includes a camming portion which engages the extension of the hold down arm, the said lever then being rotated on the pedestal into a locking engagement wherein a latch element provides a downward thrust on the extension of the hold down arm in turn securely clamping the same into a locked relation with respect to the hatch opening.

BRIEF DESCRIPTION OF THE DRAWINGS

FIG. 1 is a plan view of a railway hopper car showing a roof provided with a plurality of longitudinally disposed hatch covers for sealing an elongated hatch opening;

FIG. 2 is an enlarged perspective view showing a portion of a hold down arm in closed relation with respect to a hatch cover including the latching and locking device of the present invention;

FIG. 3 is a cross sectional view taken substantially along the lines of 3—3 of FIG. 1;

FIG. 4 is a view similar to FIG. 3 showing a certain position of a latching device relative to a hold down arm of a hatch cover;

FIG. 5 is a view similar to FIGS. 3 and 4 showing another position of a latching device;

FIG. 6 is still another view similar to FIG. 5 showing an unlocked position of a latching device for the hold down arm of a latch cover; and FIG. 7 is a plan view showing a latching mechanism or latch element in a locking position relative to the hold down arm of a hatch cover.

Description of Preferred Embodiment

FIG. 1 discloses a plan view of a railway hopper car 10 having a continuous roof construction 11 surrounded by longitudinal and transverse walkways 12 and 13. The roof is provided with an elongated longitudinally extending hatch opening 14 surrounded peripherally by continuous upright coaming 15 which includes, as best shown in FIGS. 3, 4, 5 and 6 an outwardly extending arcuate top flange 16. The roof construction 11 includes a stepped roof sheet 17 which in turn hingedly supports a plurality of longitudinally extending hatch covers 18. As best disclosed in aforementioned U.S. Pat. No. 3,800,714, the hatch covers include ends which are positioned in substantially adjacent contiguous relation so that each of the covers may be individually opened relative to the hatch opening. Each of the hatch covers also includes downwardly and outwardly projecting flanges 19 which in a closed position are positioned below the arcuate flanges 16. As best shown in FIGS. 3 through 5, the hatch covers 18 also include seal portions 20 of resilient sealing material which are adapted to engage each of the flanges 16 in compressed and sealing relation when the covers are held in a closed position. The hatch covers 18 are hingedly supported on the roof by a plurality of hinge brackets 21 as is conventional in the art. Adjacent edges or ends of each of the hatch covers 18 are retained in a closed position by means of U-shaped hold down arms 22. Each of the hold down arms 22 is hingedly connected to the roof 11 by means of hinge brackets 23. The U-shaped hold down arms 22 are also provided with downwardly projecting seals 24 of resilient material which are adapted to engage adjacent edges of the hatch openings for securing the same and for sealing the space therebetween. The seal is retained within downwardly projecting flanges 25 of the hold down arms 22. A serpentine shaped bracket 26 includes a downwardly and outwardly extending portion 27 having at its lower end a horizontally extending outwardly projecting extension or locking portion 28. A latch member or locking lever is generally designated at 29 and has supported thereon an operating handle 30 which may be gripped by the operator. The lever 29 also is provided with an arcuate camming portion 31 which in turn is connected to a latching element 32 reversely turned or being positioned in substantially overlapping parallel relation relative to the lever 29, as best shown in FIGS. 3 to 5. The latch member of lever 29 also includes a central gusset or supporting wall 33 connected to each of the camming portion 31, the latch element 32 and the lever 29. The central wall 33 is provided with a slot 34 which has a slightly arcuate shaped configuration. The operating lever 29 is slidably supported on a pedestal generally designated at 35, the same consisting of a pair of longitudinally spaced brackets 36 of plate-like shape. Longitudinally spaced transversely extending connector plates or feet 37 are connected to the lower ends of the brackets 36 and are thus secured to the roof construction 11. As best shown in FIGS. 3 and 4, the plates 36 are also interconnected by means of longitudinally extending front supports 38 and by means of rear supports 39 laterally spaced with respect to the aforementioned supports 38. Each of the plates 37 is provided with a slot 40 having a horizontally extending portion 41 and an arcuate and vertical portion 43. Each of the slots 40 is in longitudinal alignment with the other.

As best shown in FIG. 2, a bolt 44 includes a head 44', as shown in FIG. 7, the said bolt 44 extending through the slots 34 and 40. A spacer 45 is positioned on each of opposite sides of the support 33 for retaining the said bolt 44 centrally in relative sliding relation with respect to the slot 34. The bolt further is secured by means of a washer 46 and nut 47.

THE OPERATION

In order to dispose the hatch covers 18 in the open position of the latch lever 29, which is disclosed in FIG. 6, the hold down arms 22 are pivoted relative to the hinge brackets 23 in a counterclockwise manner whereupon they then rest on one side of the hatch opening on the roof construction. Each of the hatch covers then may be lifted upwardly about the hinge brackets 21 whereupon the covers are laid upon and supported on the roof structure adjacent to the longitudinally extending hatch opening. The reverse operation takes place in closing of the hatch covers and they then can be effectively sealed by means of the greatly simplified lever arrangement disclosed in FIGS. 2, 3, 4 and 5. In the position shown in FIG. 6, the lever or latch member 29 is positioned at rest whereupon the handle 30 is seated upon one of the transverse supports 38 and the latch element 32 is at rest in supported engagement with respect to the support element 39. Referring now to FIG. 5, the handle has been moved with the bolt 44 sliding within the slot 40 upwardly into a position wherein the arcuate camming surface 31 is disposed immediately above the locking portion or extension 28. Further rotating movement in a counterclockwise direction of the lever 29 as is shown in FIG. 4, provides for the arcuate camming element 31 being pivoted into engagement with extension 28 thereby camming the hold down arm downwardly whereby the seal 20 is compressed between the cover 18 and the flange 16. At this point the bolt 44 has moved upwardly into the horizontal portion 41 of the slot 40 and the bolt also has moved upwardly approximately half way into the slot 34 provided in the central wall 33 as shown in FIG. 4. Continued rotating movement of the lever 29 into the position of FIG. 3 discloses that the latch element 32 is now moved into engaging horizontal compressing position with respect to the extension 28 and the lever 29 has its end in engagement resting upon the top of the bracket 26 of the hold down arm. The bolt 44 has now moved to the end of the slot 40 and also is at the end of the said slot 34 having its innermost end portion disposed below or in a relatively over center position relative to the point of rotation of the lever 29. Thus, it is clear that the hold down arm is now in a tightly engaged position with the seal compressed between the flange 16 and the underneath surface of the hatch cover 18. The seal 24 also is rigidly compressed into adjacent edges of the hatch covers 18 and the entire assembly is in a completely locked and sealed position. In order to return the lever 29 to the open position shown in FIG. 6, it is a simple matter to reverse the procedure above described.

What is claimed is:
1. A hopper hatch structure including a roof having a coaming defining a hatch opening,
    a hatch cover hingedly connected to said roof for movement between open and closed positions relative to said opening,
    a hold down arm supported on said roof including portions engaging said hatch cover in said closed position,
    said hold down arm having a locking portion extension projecting horizontally outwardly relative to said coaming in the engaging position of said arm, the improvement comprising;
    a latch mechanism releasably locking said hatch cover in the closed position including,
    latch support means mounted on said roof to one side of said coaming including,
    an upstanding pedestal having guide means thereon,
    a manually operative latch member on said pedestal confined by said guide means for sliding movement from a lowered non-operative position longitudinally outwardly of said arm to a locking position,
    said latch member comprising a lever,
    a latch element connected to said lever and extending co-directionally with said lever in overlapping relation,
    operator engageable means on said lever whereupon an operator may move said latch member from said non-operative position slidingly along said guide means upwardly and inwardly over said locking extension, said latch element including means initially engaging and forcing said extension downwardly,
    said latch member being thereupon rotatable on said guide means whereupon said latch element engages said extension in locking relation and said lever overlies said hold down arm, and
    said means initially engaging said extension during locking movement of said latch member including an arcuate cam portion connecting said latch element to said lever.
2. The invention in accordance with claim 1,
    said guide means including an upwardly and laterally inwardly extending slot,
    and slideable connector means on said latch member connecting the same in sliding relation relative to said slot.
3. The invention in accordance with claim 2,
    said slideable connector means providing for relative pivotal movement of said latch member relative to said pedestal.
4. The invention in accordance with claim 1,
    said latch member in the non-operative position having said lever portion extending vertically and being supported on said pedestal.
5. The invention in accordance with claim 1,
    said operator engageable means including a handle supported on top at said lever.
6. The invention in accordance with claim 1,
    said latching element being connected to said lever by a camming portion extending downwardly from said lever in the closed position thereof.
7. A hopper hatch structure including a roof having a coaming defining a hatch opening,
    a hatch cover hingedly connected to said roof for movement between open and closed positions relative to said opening,
    a hold down arm supported on said roof including portions engaging said hatch cover in said closed position, said hold down arm having a locking portion extension projecting horizontally outwardly relative to said coaming in the engaging position of said arm, the improvement comprising;
a latch mechanism releasably locking said hatch cover in the closed position including,
latch support means mounted on said roof to one side of said coaming including,
an upstanding pedestal having guide means thereon,
a manually operative latch member on said pedestal confined by said guide means for sliding movement from a lowered non-operative position longitudinally outwardly of said arm to a locking position,
said latch member comprising a lever,
a latch element connected to said lever and extending co-directionally with said lever in overlapping relation,
operator engageable means on said lever whereupon an operator may move said latch member from said non-operative position slidingly along said guide means upwardly and inwardly over said locking extension,
said latch element including means initially engaging and forcing said extension downwardly,
said latch member being thereupon rotatable on said guide means whereupon said latch element engages said extension in locking relation and said lever overlies said hold down arm,
said guide means including an upwardly and laterally inwardly extending slot,
slidable connector means on said latch member connecting the same in sliding relation relative to said slot,
said slidable connector means providing for relative pivotal movement of said latch member relative to said pedestal,
said latch member including a support portion having a second slot adapted to register with said first slot, and said slidable connector comprising a pivot stud connected through said slots.

8. The invention in accordance with claim 7,
said first slot being disposed in a vertical plate extending normal to said coaming, and said support including a second plate containing said second slot, and said plates being relatively parallel and contiguous.

9. The invention in accordance with claim 8,
said latch element being connected to said lever by a curved cam portion, said curved cam portion initially engaging said extension in camming relation and said second slot providing with said stud a lost motion connection to move said latch element into said locking relation with respect to said locking extension.

* * * * *